United States Patent
Suzuki et al.

(10) Patent No.: US 11,243,732 B2
(45) Date of Patent: Feb. 8, 2022

(54) PRINT MANAGEMENT APPARATUS TO DETERMINE AMOUNT OF SPOILAGE IN CONTINUOUS SHEET AND NON-TRANSITORY COMPUTER READABLE MEDIUM

(71) Applicant: FUJIFILM Business Innovation Corp., Tokyo (JP)

(72) Inventors: Kodai Suzuki, Kanagawa (JP); Hisao Komazawa, Kanagawa (JP); Kentaro Ikeda, Kanagawa (JP); Takashi Betsuyaku, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/929,122

(22) Filed: Jul. 15, 2020

(65) Prior Publication Data

US 2021/0286573 A1 Sep. 16, 2021

(30) Foreign Application Priority Data

Mar. 13, 2020 (JP) .............................. JP2020-044459

(51) Int. Cl.
*G06F 3/12* (2006.01)
*H04N 1/00* (2006.01)

(52) U.S. Cl.
CPC .......... *G06F 3/1267* (2013.01); *G06F 3/1205* (2013.01); *G06F 3/1251* (2013.01); *H04N 1/00477* (2013.01); *H04N 1/00676* (2013.01)

(58) Field of Classification Search
CPC .... G06F 3/1267; G06F 3/1205; G06F 3/1251; H04N 1/00477; H04N 1/00676

USPC ........................................................ 358/1.15
See application file for complete search history.

(56) References Cited

U.S. PATENT DOCUMENTS

| | | | |
|---|---|---|---|
| 10,025,249 B2 | 7/2018 | Noda | |
| 2006/0087113 A1* | 4/2006 | Snyder | B42D 5/026 283/106 |
| 2012/0081753 A1* | 4/2012 | Rufes | B41J 3/60 358/1.18 |
| 2014/0270396 A1* | 9/2014 | Miyagawa | H04N 1/0049 382/112 |
| 2015/0183214 A1* | 7/2015 | Yasuzaki | B41J 2/2142 347/9 |
| 2016/0275387 A1* | 9/2016 | Kanno | G06K 15/4025 |
| 2019/0018629 A1* | 1/2019 | Seay | B65H 35/02 |
| 2019/0354054 A1* | 11/2019 | Yamamoto | G03G 15/5062 |

FOREIGN PATENT DOCUMENTS

| | | |
|---|---|---|
| JP | 2004262070 | 9/2004 |
| JP | 2005219333 | 8/2005 |
| JP | 2010-014935 | 1/2010 |
| JP | 5770580 | 8/2015 |
| JP | 2017207597 | 11/2017 |
| WO | 2013038823 | 3/2013 |

* cited by examiner

*Primary Examiner* — Allen H Nguyen
(74) *Attorney, Agent, or Firm* — JCIPRNET

(57) ABSTRACT

A print management apparatus includes a processor configured to, when a printer configured to perform printing on a continuous sheet prints a job, which contains multiple pages, on the continuous sheet, output the area of a part of the continuous sheet as the amount of spoilage. The part is not used for a product manufactured by using printed material corresponding to the job.

20 Claims, 18 Drawing Sheets

FIG. 5

| | ID | Job Name | Information | State | RIP Processing | RIP Remaining Time | Printing | Print Remaining Time |
|---|---|---|---|---|---|---|---|---|

Job Management Screen

In-process Jobs: 0 | Pending Jobs: 0 | Error: 0 | Completed: 0 | Job History

Job Details

PRINT MANAGEMENT APPARATUS TO DETERMINE AMOUNT OF SPOILAGE IN CONTINUOUS SHEET AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-044459 filed Mar. 13, 2020.

BACKGROUND

(i) Technical Field

The present disclosure relates to a print management apparatus and a non-transitory computer readable medium.

(ii) Related Art

For example, Japanese Patent No. 5770580 describes a print sequence determination apparatus, which determines the print sequence of multiple print jobs on a single unit of print sheet, in a print system having multiple print settings or multiple post-processing settings. The print sequence determination apparatus includes a spoilage-amount storage unit and an input data storage unit. The spoilage-amount storage unit stores, in advance, the amounts of spoilage parts of the sheet (hereinafter referred to as "the amounts of spoilage") which are produced when each print setting is changed to a different print setting, or the amounts of spoilage which are produced when each post-processing setting is changed to a different post-processing setting. The input data storage unit stores multiple pieces of input data, each of which includes a print sheet type, a print specification, a post-processing specification, and print image data. The print sequence determination apparatus also includes a computation unit that performs steps a) to c) on multiple pieces of common-sheet-type input data, having a common print sheet type, among the pieces of input data so as to determine the print sequence of multiple print jobs, which is generated from the pieces of common-sheet-type input data. In step a), for one print sequence of the pieces of common-sheet-type input data, the amount of spoilage is obtained from the spoilage-amount storage unit either on the basis of the print settings of the print system corresponding to the print specifications of each pair, whose pieces are adjacent to each other in the print sequence, of the common-sheet-type input data, or on the basis of the post-processing settings of the print system corresponding to the post-processing specifications of each pair of the common-sheet-type input data. In step b), the total amount of spoilage, which is the total of the amounts of spoilage of the multiple pieces of common-sheet-type input data, is obtained. In step c), the print sequence, whose total amount of spoilage is minimum, is obtained by performing step a) and step b) on each print sequence of the multiple pieces of common-sheet-type input data.

Japanese Unexamined Patent Application Publication No. 2017-207597 describes an image forming apparatus which provides information about the schedule of use of a continuous sheet in execution of jobs. The image forming apparatus includes a transport unit, an image forming unit, a job selection unit, and a controller. The transport unit transports the continuous sheet. The image forming unit forms images on the continuous sheet transported by the transport unit. The job selection unit selects jobs that are to be done. The controller calculates the image formation distance indicating the length, which is necessary for execution of the selected jobs, in the transport direction of the continuous sheet, and causes a display unit to display the calculated image formation distance.

A printer, which performs printing on a continuous sheet such as a roll sheet, produces parts (hereinafter referred to as "spoilage" or "spoilage parts"), which are not used for final products, of the continuous sheet in processing of print jobs. However, the amount of produced spoilage parts is not determined.

SUMMARY

Aspects of non-limiting embodiments of the present disclosure relate to a print management apparatus and a non-transitory computer readable medium which are capable of determining, as the amount of spoilage, parts of a continuous sheet which are not used for products.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a print management apparatus including a processor configured to, when a printer configured to perform printing on a continuous sheet prints a job, which contains multiple pages, on the continuous sheet, output the area of a part of the continuous sheet as the amount of spoilage. The part is not used for a product manufactured by using printed material corresponding to the job.

BRIEF DESCRIPTION OF THE DRAWINGS

Exemplary embodiments of the present disclosure will be described in detail based on the following figures, wherein:

FIG. 5 is a diagram illustrating an exemplary job management screen according to an exemplary embodiment;

DETAILED DESCRIPTION

Figure 1:
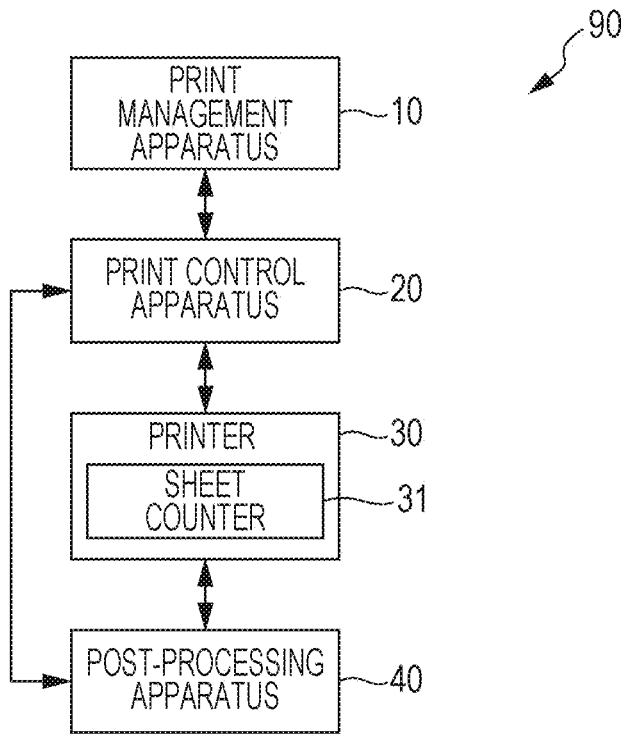
FIG. 1 is a diagram illustrating an exemplary configuration of a print management system according to a first exemplary embodiment.

Referring to the drawings, exemplary embodiments for carrying out the present disclosure will be described in detail below.

First Exemplary Embodiment

FIG. 1 is a diagram illustrating an exemplary configuration of a print management system 90 according to a first exemplary embodiment.

As illustrated in FIG. 1, the print management system 90 according to the first exemplary embodiment includes a print management apparatus 10, a print control apparatus 20, a printer 30, and a post-processing apparatus 40.

The print management apparatus 10 is connected to the print control apparatus 20 over a network. Examples of the network include the Internet, a local area network (LAN), and a wide area network (WAN). The print management apparatus 10 receives input of jobs, and instructs the print control apparatus 20 to perform printing in accordance with the received jobs. Such a job indicates a unit of print process. For example, one job indicates print data for one file that is to be printed. The number of pages contained in one file is any, that is, equal to or more than one. That is, one file corresponding to one job may be constituted, for example, by one page or by 1000 pages. The number of pages contained in one file may be determined in advance or may be set by a user when appropriate.

The print control apparatus 20 is connected to the printer 30 over a network. There may be one or more connected printers 30. The print control apparatus 20 has a function of controlling the operations of a print process performed by the printer 30.

The printer 30 is a so-called continuous form printer which performs printing on a continuous sheet such as a roll sheet. The printer 30 includes a sheet counter 31. When the continuous sheet is transported in the sheet transport direction, the sheet counter 31 is used to measure the distance from the transport start position which is used as a reference (the count value=0 m). In the first exemplary embodiment, the print control apparatus 20 and the printer 30 are formed as separate units. Alternatively, the print control apparatus 20 and the printer 30 may be formed as an integrated unit.

To assure printing with stable image quality, the printer 30 waits at a start of printing until the transport rate of the continuous sheet reaches a predetermined rate. Then, the printer 30 starts printing a job. This produces a loss part, which is not used in the printing, of the continuous sheet. In addition, at a stop of printing, inertial transport, over a predetermined distance, of the continuous sheet is performed after the stop instruction. Similarly, this produces a loss part. That is, the printer 30 produces loss parts structurally before and after printing.

The print control apparatus 20 is connected to the post-processing apparatus 40 over a network. There may be one or more connected post-processing apparatuses 40. The print control apparatus 20 has a function of controlling the post-processing operations of the post-processing apparatus 40.

The post-processing apparatus 40 includes, for example, a processing apparatus, an after-process apparatus, and a cutting apparatus. For example, the processing apparatus performs processing, such as coating with varnish for suppressing attachment of flaws and dirt on the print surface of a recording medium (hereinafter referred to as a "sheet") such as paper on which the printer 30 performs printing. The after-process apparatus performs processes such as a process of binding sheets of the body, which are folded so as to be arranged according to the page sequence, and then attaching a front cover to make the sheets in the form of a book. For example, the cutting apparatus performs processes such as cutting the margins of a book obtained through the bookbinding, and then finishing it in a predetermined size. The post-processing apparatus 40 may be connected to the printer 30 over a network.

The print management apparatus 10 receives, through the print control apparatus 20, various types of information about the operations of the printer 30, and manages the operational state and the throughput of the printer 30. The print management apparatus 10 transmits, to the printer 30 through the print control apparatus 20, various instructions, such as an instruction to operate the printer 30, an instruction to stop the printer 30, and an instruction to make settings of operations of the printer 30.

The print management apparatus 10 receives, through the print control apparatus 20, various types of information about the operations of the post-processing apparatus 40, and manages the operational state and the throughput of the post-processing apparatus 40. The print management apparatus 10 transmits, to the post-processing apparatus 40 through the print control apparatus 20, various instructions, such as an instruction to operate the post-processing apparatus 40, an instruction to stop the post-processing apparatus 40, and an instruction to make settings of operations of the post-processing apparatus 40.

Figure 2:
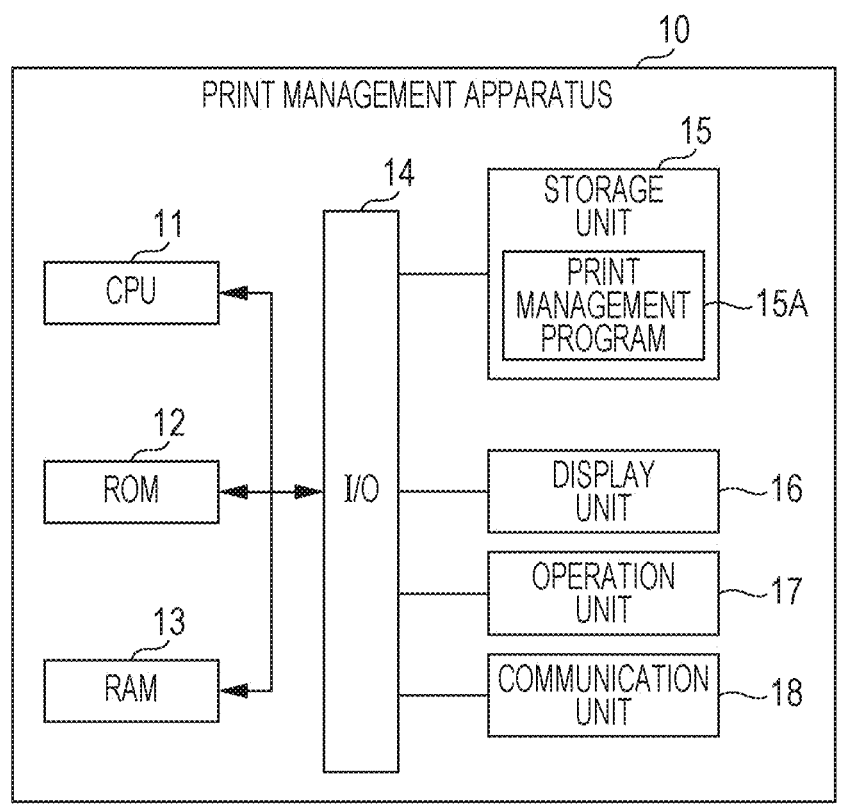
FIG. 2 is a block diagram illustrating an exemplary electrical configuration of a print management apparatus according to the first exemplary embodiment.

FIG. 2 is a block diagram illustrating an exemplary electrical configuration of the print management apparatus 10 according to the first exemplary embodiment.

As illustrated in FIG. 2, the print management apparatus 10 according to the first exemplary embodiment includes a central processing unit (CPU) 11, a read only memory (ROM) 12, a random access memory (RAM) 13, an input/output interface (I/O) 14, a storage unit 15, a display unit 16, an operation unit 17, and a communication unit 18.

For example, a general-purpose computer, such as a server or a personal computer (PC), is used as the print management apparatus 10 according to the first exemplary embodiment.

The CPU 11, the ROM 12, the RAM 13, and the I/O 14 are connected to each other through a bus. The functional units including the storage unit 15, the display unit 16, the operation unit 17, and the communication unit 18 are connected to the I/O 14. The functional units are capable of communicating with the CPU 11 through the I/O 14.

The CPU 11, the ROM 12, the RAM 13, and the I/O 14 constitute a controller. The controller may be formed as a sub-controller controlling some of the operations of the print management apparatus 10, or may be formed as a part of the main controller controlling the operations of the entire print management apparatus 10. For example, an integrated circuit of large scale integration (LSI) or the like, or an integrated circuit (IC) chipset is used as a part or the entirety of each block of the controller. An individual circuit may be used as each block described above, or a circuit obtained through integration of a part or the entirety of the block may be used. The blocks described above may be provided as an integrated unit, or some of the blocks may be provided separately. A part of each block described above may be provided separately. Integration of the controller is not limited to LSI, and a dedicated circuit or a general-purpose processor may be used.

For example, a hard disk drive (HDD), a solid state drive (SSD), or a flash memory is used as the storage unit 15. The storage unit 15 stores a print management program 15A for implementing a print management function according to the first exemplary embodiment. The print management program 15A may be stored in the ROM 12.

For example, the print management program 15A may be installed in advance in the print management apparatus 10. The print management program 15A, which is stored in a nonvolatile non-transitory storage medium or is distributed over a network, may be installed in the print management apparatus 10 when appropriate. Examples of a nonvolatile non-transitory storage medium may include a compact disc read only memory (CD-ROM), a magneto-optical disk, an HDD, a digital versatile disc read only memory (DVD-ROM), a flash memory, and a memory card.

For example, a liquid crystal display (LCD) or an organic electro luminescence (EL) display is used as the display unit 16. The display unit 16 may be integrated with a touch panel. For example, the operation unit 17 is provided with input-operation devices, such as a keyboard and a mouse. The display unit 16 and the operation unit 17 receive various instructions from a user of the print management apparatus 10. The display unit 16 displays various types of information, such as the result of a process, which is performed in accordance with an instruction received from a user, and notification to a process.

The communication unit 18, which is connected to a network, such as the Internet, a LAN, or a WAN, is capable of communicating with the print control apparatus 20 over the network. The communication over a network may be wired or wireless.

Determining the amount of spoilage in use of a continuous sheet such as a roll sheet is useful for cost management of a printing company or the like. However, parts, which are not used for products, of a continuous sheet have not been determined as the amount of spoilage in processing of print jobs.

Figure 3:
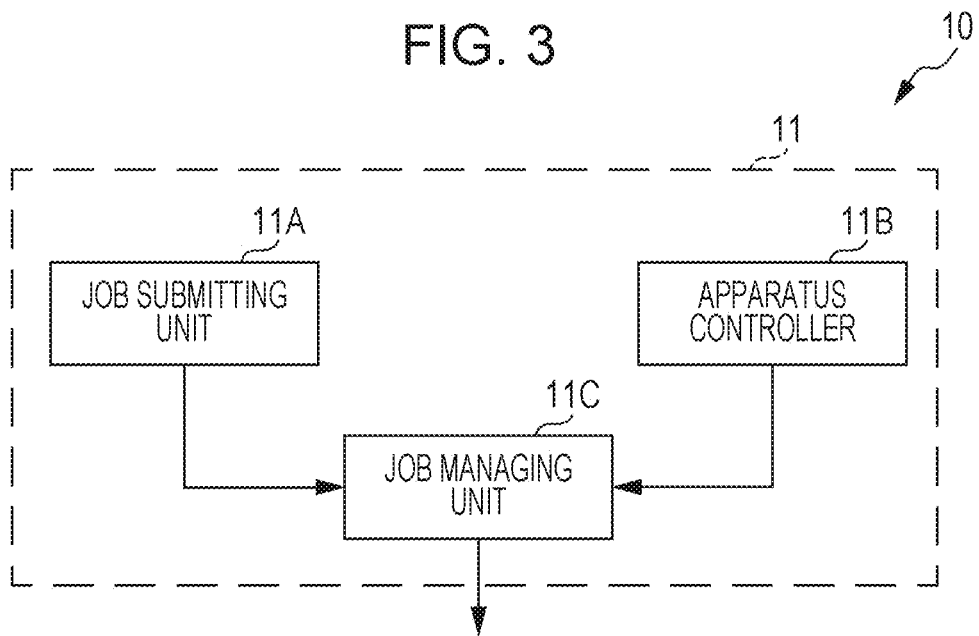
FIG. 3 is a block diagram illustrating an exemplary functional configuration of a print management apparatus according to the first exemplary embodiment.

To address this issue, the CPU 11 of the print management apparatus 10 according to the first exemplary embodiment writes the print management program 15A, which is stored in the storage unit 15, on the RAM 13 for execution, functioning as the units in FIG. 3. The CPU 11 corresponds to an exemplary processor.

FIG. 3 is a block diagram illustrating an exemplary functional configuration of the print management apparatus 10 according to the first exemplary embodiment.

As illustrated in FIG. 3, the CPU 11 of the print management apparatus 10 according to the first exemplary embodiment functions as a job submitting unit 11A, an apparatus controller 11B, and a job managing unit 11C.

The job submitting unit 11A according to the first exemplary embodiment submits a job received from a person (operator) in charge of operation.

The apparatus controller 11B according to the first exemplary embodiment communicates with the print control apparatus 20 and controls the operations of the print control apparatus 20. The apparatus controller 11B obtains, from the print control apparatus 20, various types of information (hereinafter referred to as "spoilage part information") which are necessary in calculation of the amount of spoilage. The spoilage part information includes, for example, the sheet size, the number of pages for control, and the sheet type which are described below.

When the printer 30 does a print job, containing multiple pages, on a continuous sheet, the job managing unit 11C according to the first exemplary embodiment outputs the amount of spoilage of the continuous sheet. The spoilage indicates loss parts, which are not used for a product manufactured by using printed material corresponding to a job, and is also called waste. The amount of spoilage is represented as the area of the loss parts described above. The amount of spoilage, which depends on print job conditions (for example, color, black and white, the print speed, and whether or not post-processing is to be performed), varies depending on each job.

Specifically, when the job submitting unit 11A submits a job, the job managing unit 11C calculates the amount of spoilage on the basis of the spoilage part information obtained from the apparatus controller 11B. The amount of spoilage according to the first exemplary embodiment is represented as the area of a part for pages for control, not for a job. Such a page for control is a page which is inserted, for example, before or after a job or between jobs and which is also referred to as a so-called refresh page or separator page. Examples of the page for control include a page, on which a test pattern including the cyan, magenta, yellow, and black (CMYK) colors is printed, and a white page.

Figure 4:
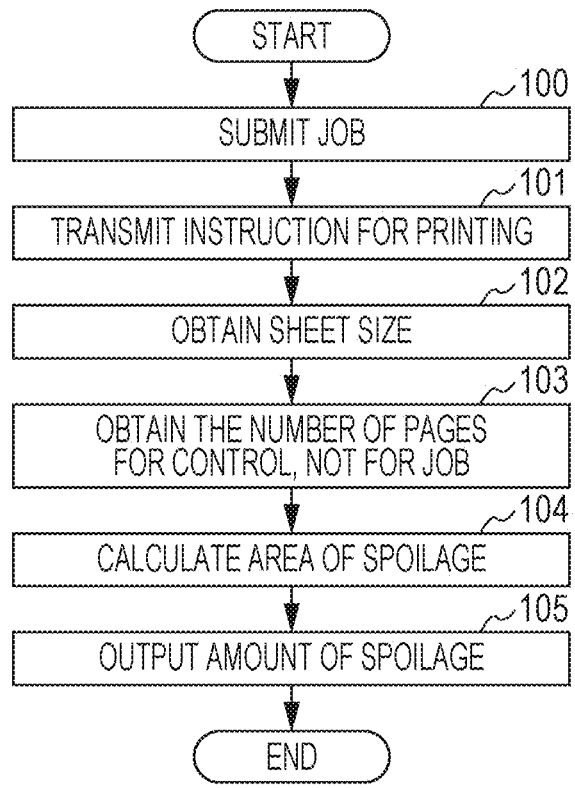
FIG. 4 is a flowchart of exemplary processes performed by using a print management program according to the first exemplary embodiment.

Referring to FIG. 4, operation of the print management apparatus 10 according to the first exemplary embodiment will be described.

FIG. 4 is a flowchart of exemplary processes performed by using the print management program 15A according to the first exemplary embodiment.

In response to an instruction to output pages for control, not for a job, as the amount of spoilage, the print management apparatus 10 activates the print management program 15A, and performs the steps described below.

In step 100 in FIG. 4, the job submitting unit 11A submits a job to the job managing unit 11C. The submitted job is managed, for example, by using a job management screen illustrated in FIG. 5.

FIG. 5 is a diagram illustrating an exemplary job management screen according to the first exemplary embodiment.

On the job management screen in FIG. 5, jobs submitted by the job submitting unit 11A are registered, and the states of the jobs are managed until completion of the jobs.

In step 101, the job submitting unit 11A notifies the job managing unit 11C of an instruction to print the job submitted in step 100.

In step 102, the job managing unit 11C obtains, from the apparatus controller 11B, the sheet size which is the size of the continuous sheet. Examples of the sheet size of a continuous sheet include the sheet width, the sheet length, and the like of the continuous sheet.

In step 103, the job managing unit 11C obtains, from the apparatus controller 11B, the number of pages for control, not for a job. The sheet size and the number of pages for control are managed, for example, by using a basic-information edit screen illustrated in FIG. 6.

Figure 6:
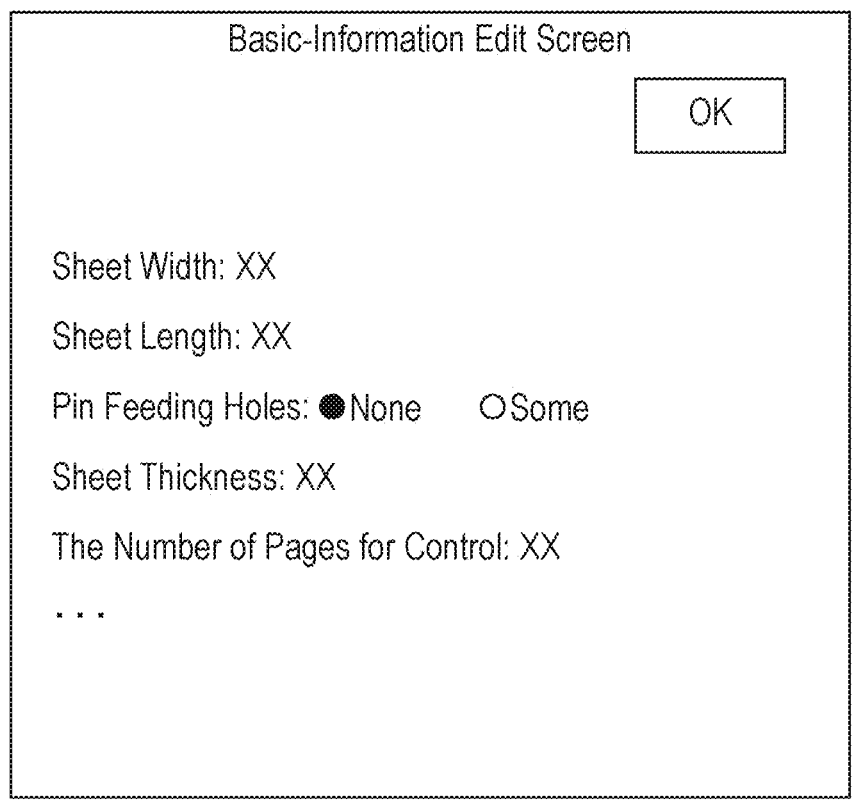
FIG. 6 is a diagram illustrating an exemplary basic-information edit screen according to an exemplary embodiment.

FIG. 6 is a diagram illustrating an exemplary basic-information edit screen according to the first exemplary embodiment.

On the basic-information edit screen illustrated in FIG. 6, the sheet size, the number of pages for control, and the like, which are obtained from the apparatus controller 11B, are registered and managed.

In step 104, the job managing unit 11C calculates the area of spoilage on the basis of the sheet size, which is obtained in step 102, and the number of pages for control which is obtained in step 103. Specifically, for example, when the sheet width is W mm and the number of pages for control is N, the area of spoilage is calculated as W mm×L mm×N. In this example, the size (W mm×L mm) of a page for control is set in advance.

In step 105, the job managing unit 11C tabulates the area of spoilage, which is calculated in step 104, as the amount of spoilage for the corresponding one of jobs. The job managing unit 11C outputs the tabulation result, for example, to the display unit 16. Then, the series of processes performed by using the print management program 15A end.

Figure 7:
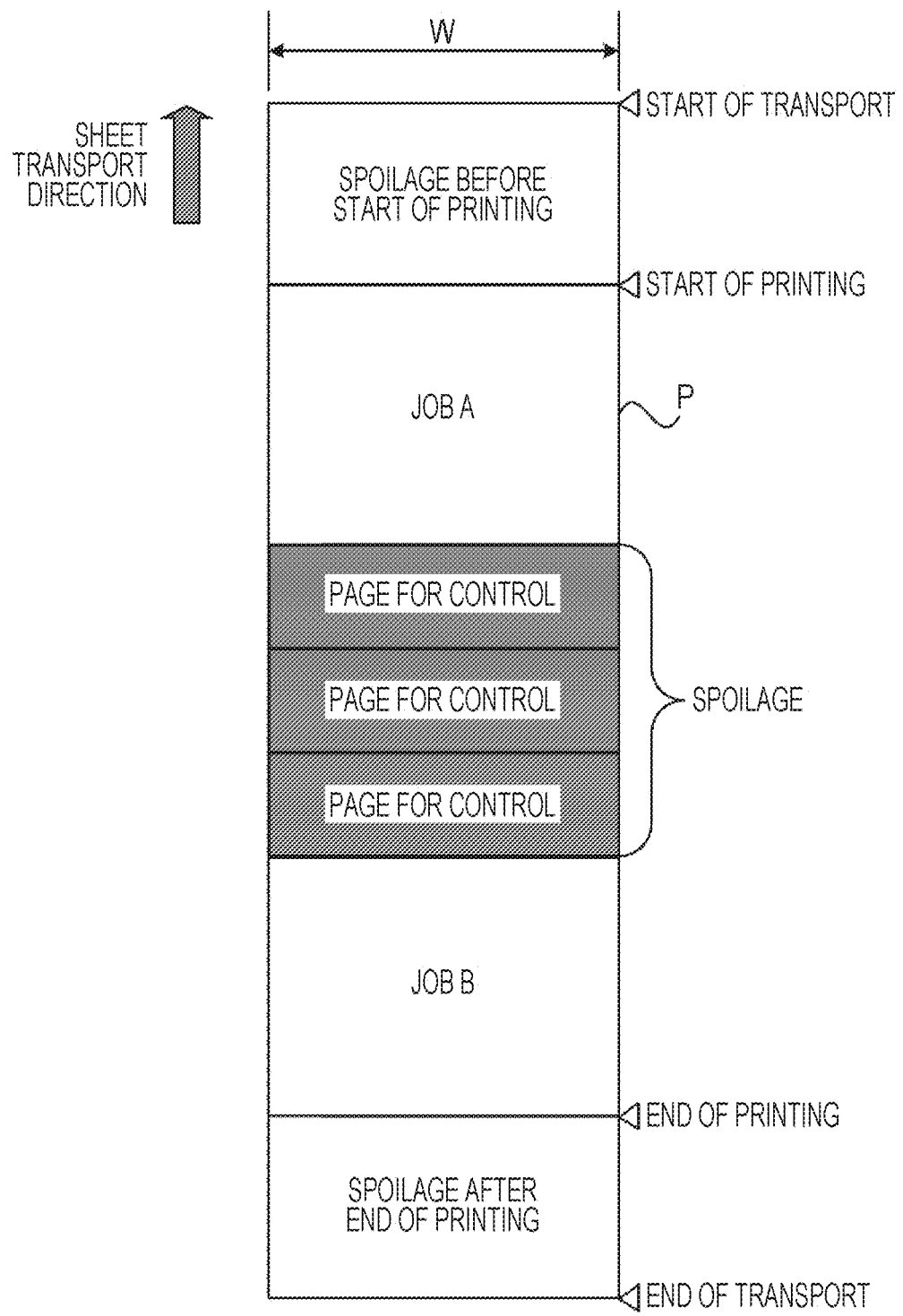
FIG. 7 is a diagram for describing a method of calculating the area of spoilage, according to the first exemplary embodiment.

Referring to FIG. 7, a method of calculating the area of spoilage in the case where pages for control are regarded as spoilage will be described specifically.

FIG. 7 is a diagram for describing the method of calculating the area of spoilage, according to the first exemplary embodiment.

The example in FIG. 7 illustrates the case in which multiple jobs, job A and job B, are processed by using a continuous sheet P and in which multiple pages for control are inserted between job A and job B.

The position at which transport of the continuous sheet P is started is set to a position at which the count value of the sheet counter 31 of the printer 30 is set to zero. A part from the transport start position of the continuous sheet P to the print start position of job A is regarded as spoilage before start of printing. The amount of spoilage before start of printing is calculated on the basis of the measurement result obtained by the sheet counter 31. The amount of spoilage for the pages for control, not for the jobs, is calculated from the sheet size and the number of pages for control which are described above. A part from the print end position of job B to the transport end position of the continuous sheet P is regarded as spoilage after end of printing. The amount of spoilage after end of printing is calculated on the basis of the measurement result obtained by the sheet counter 31.

The total of the amount of spoilage before start of printing, the amount of spoilage for the pages for control, and the amount of spoilage after end of printing are calculated. Thus, the total amount of spoilage is calculated. In this case, for example, the total amount of spoilage is divided proportionally between job A and job B, and the amounts of spoilage for the jobs are obtained.

According to the first exemplary embodiment, pages for control, not for a job, are determined as a part which is not used for a product. Thus, the area of the part for the pages for control, not for a job, is determined as the amount of spoilage.

Second Exemplary Embodiment

In a second exemplary embodiment, the case in which parts between pages which are defined by using cutting positions used in the post-processing are determined as spoilage will be described.

The apparatus configuration of the print management apparatus 10, which is described in the first exemplary embodiment, is applied also to the second exemplary embodiment. The amount of spoilage according to the second exemplary embodiment is represented as the area of parts between pages which are defined by using cutting positions at which the post-processing apparatus 40 connected to the printer 30 performs cutting in accordance with the pages.

When the print control apparatus 20, controlling the operations of the printer 30, controls printing of cutting marks on a continuous sheet, the job managing unit 11C according to the second exemplary embodiment obtains, from the print control apparatus 20, print information including cutting marks, and specifies cutting positions on the basis of the obtained print information.

Figure 8:
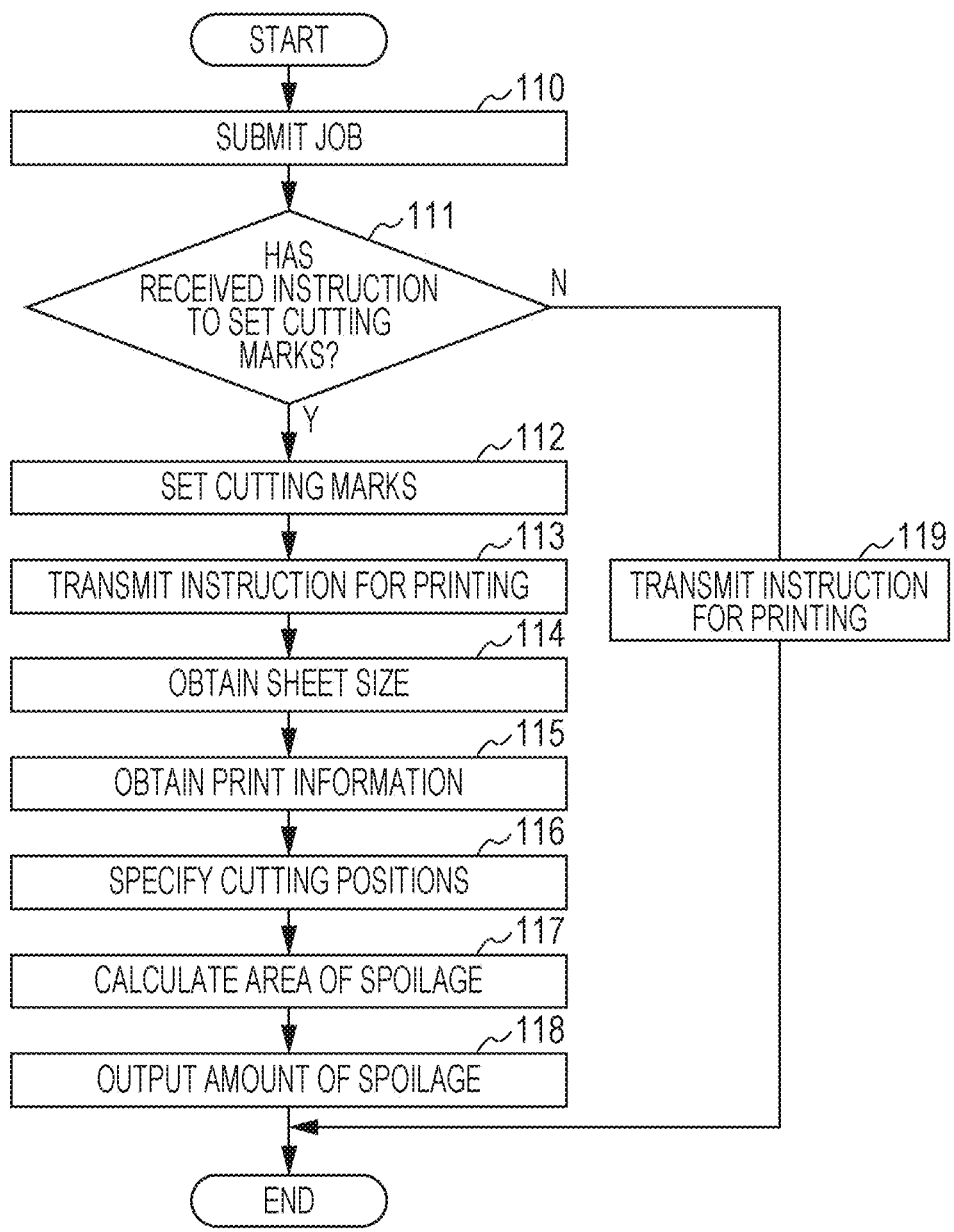
FIG. 8 is a flowchart of exemplary processes performed by using a print management program according to a second exemplary embodiment.

Referring to FIG. 8, operation of the print management apparatus 10 according to the second exemplary embodiment will be described.

FIG. 8 is a flowchart of exemplary processes performed by using the print management program 15A according to the second exemplary embodiment.

In response to an instruction to output, as the amount of spoilage, the area of parts between pages defined by using cutting positions used in the post-processing, the print management apparatus 10 activates the print management program 15A, and performs the steps described below.

In step 110 in FIG. 8, the job submitting unit 11A submits a job to the job managing unit 11C.

In step 111, the job submitting unit 11A determines whether or not an instruction to set cutting marks has been received from a person (operator) in charge of operation. If it is determined that an instruction to set cutting marks has been received (in the case of the positive determination result), the process proceeds to step 112. If it is determined that an instruction to set cutting marks has not been received (in the case of the negative determination result), the process proceeds to step 119.

In step 112, the job submitting unit 11A sets cutting marks to the job managing unit 11C.

In step 113, the job submitting unit 11A notifies the job managing unit 11C of an instruction to print the job submitted in step 110.

In step 114, the job managing unit 11C obtains the sheet size of the continuous sheet from the apparatus controller 11B.

In step 115, the job managing unit 11C obtains, from the apparatus controller 11B, print information including cutting marks.

In step 116, the job managing unit 11C specifies cutting positions on the basis of the print information obtained in step 115.

Figure 9:
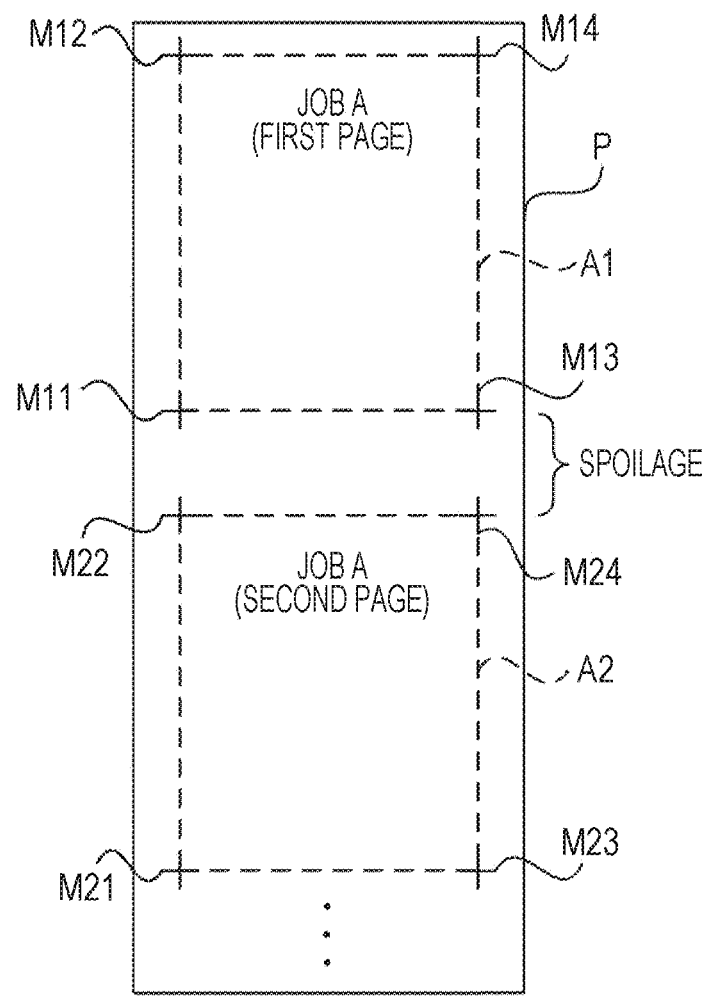
FIG. 9 is a diagram for describing a method of calculating the area of spoilage, according to the second exemplary embodiment.

In step 117, the job managing unit 11C calculates the area of spoilage on the basis of the sheet size obtained in step 114 and the cutting positions specified in step 116. Referring to FIG. 9, a method of calculating the area of spoilage in the case where parts between pages defined by using the positions of the cutting marks are regarded as spoilage will be described specifically.

FIG. 9 is a diagram for describing the method of calculating the area of spoilage, according to the second exemplary embodiment.

In the example in FIG. 9, job A containing multiple pages is processed on a continuous sheet P. A product part A1 corresponding to the first page of job A is cut by using cutting marks M11 to M14 (in the example in FIG. 9, represented by "+"). A product part A2 corresponding to the second page is cut by using cutting marks M21 to M24 (in the example in FIG. 9, represented by "+"). The print control apparatus 20 controls printing of the cutting marks M11 to M14 and the cutting marks M21 to M24. The print information generated by the print control apparatus 20 includes the cutting marks M11 to M14 and the cutting marks M21 to M24. The cutting positions are specified by using the cutting marks M11 to M14 and the cutting marks M21 to M24 which are included in the print information. In the example in FIG. 9, a part between the cutting marks M11 and M13 in the first page and the cutting marks M22 and M24 in the second page are regarded as spoilage. When the length of each part is L mm, the area of spoilage is calculated as W mm×L mm.

In step 118, the job managing unit 11C tabulates the area of spoilage, which is calculated in step 117, as the amount of spoilage for the corresponding one of jobs. The job managing unit 11C outputs the tabulation result, for example, to the display unit 16. Then, the series of processes performed by using the print management program 15A end.

In contrast, in step 119, the job submitting unit 11A notifies the job managing unit 11C of an instruction to print the job submitted in step 110. Then, the series of processes performed by using the print management program 15A end.

When a job includes cutting marks, the job managing unit 11C according to the second exemplary embodiment may obtain, from the print control apparatus 20 which controls the operations of the printer 30, the positions of the cutting marks included in the job. The job managing unit 11C may specify the cutting positions on the basis of the obtained cutting marks. In this case, the print control apparatus 20 having an image recognition function obtains image data including cutting marks, and performs image recognition on the image data, thus recognizing the cutting marks.

Figure 10:
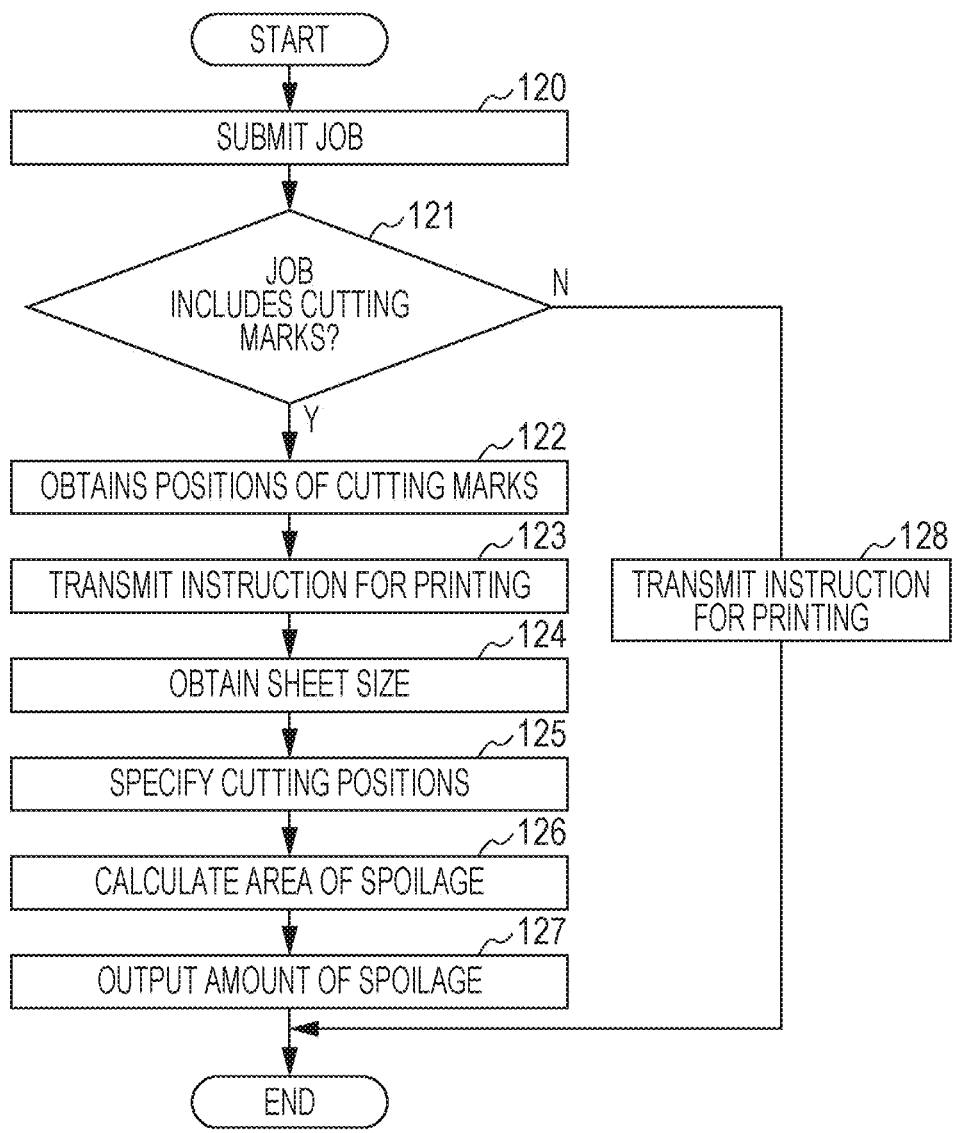
FIG. 10 is a flowchart of different exemplary processes performed by a print management program according to the second exemplary embodiment.

Referring to FIG. 10, different operation of the print management apparatus 10 according to the second exemplary embodiment will be described.

FIG. 10 is a flowchart of different exemplary processes performed by using the print management program 15A according to the second exemplary embodiment.

In response to an instruction to output, as the amount of spoilage, the area of parts between pages defined by using cutting positions used in the post-processing, the print management apparatus 10 activates the print management program 15A, and performs the steps described below.

In step 120 in FIG. 10, the job submitting unit 11A submits a job to the job managing unit 11C.

In step 121, the job managing unit 11C determines whether or not the job submitted in step 120 includes cutting marks. Whether or not the job includes cutting marks is determined, for example, on the basis of the image recognition result from the print control apparatus 20. If it is determined that the job includes cutting marks (in the case of the positive determination result), the process proceeds to step 122. If it is determined that the job includes no cutting marks (in the case of the negative determination result), the process proceeds to step 128.

In step 122, the job managing unit 11C obtains the positions of the cutting marks from the apparatus controller 11B.

In step 123, the job submitting unit 11A notifies the job managing unit 11C of an instruction to print the job submitted in step 120.

In step 124, the job managing unit 11C obtains the sheet size of the continuous sheet from the apparatus controller 11B.

In step 125, the job managing unit 11C specifies the cutting positions on the basis of the positions of the cutting marks obtained in step 122.

In step 126, the job managing unit 11C calculates the area of spoilage on the basis of the sheet size obtained in step 124 and the cutting positions specified in step 125.

In step 127, the job managing unit 11C tabulates the area of spoilage, which is calculated in step 126, as the amount of spoilage for the corresponding one of jobs. The job managing unit 11C outputs the tabulation result, for example, to the display unit 16. Then, the series of processes performed by using the print management program 15A end.

In contrast, in step 128, the job submitting unit 11A notifies the job managing unit 11C of an instruction to print the job submitted in step 120. Then, the series of processes performed by using the print management program 15A end.

When a continuous sheet has part processed for cutting, the job managing unit 11C according to the second exemplary embodiment may obtain the positions of the part processed for cutting in the continuous sheet from the print control apparatus 20 controlling the operations of the printer 30. The job managing unit 11C may specify cutting positions on the basis of the obtained positions of the part processed for cutting.

Figure 11:
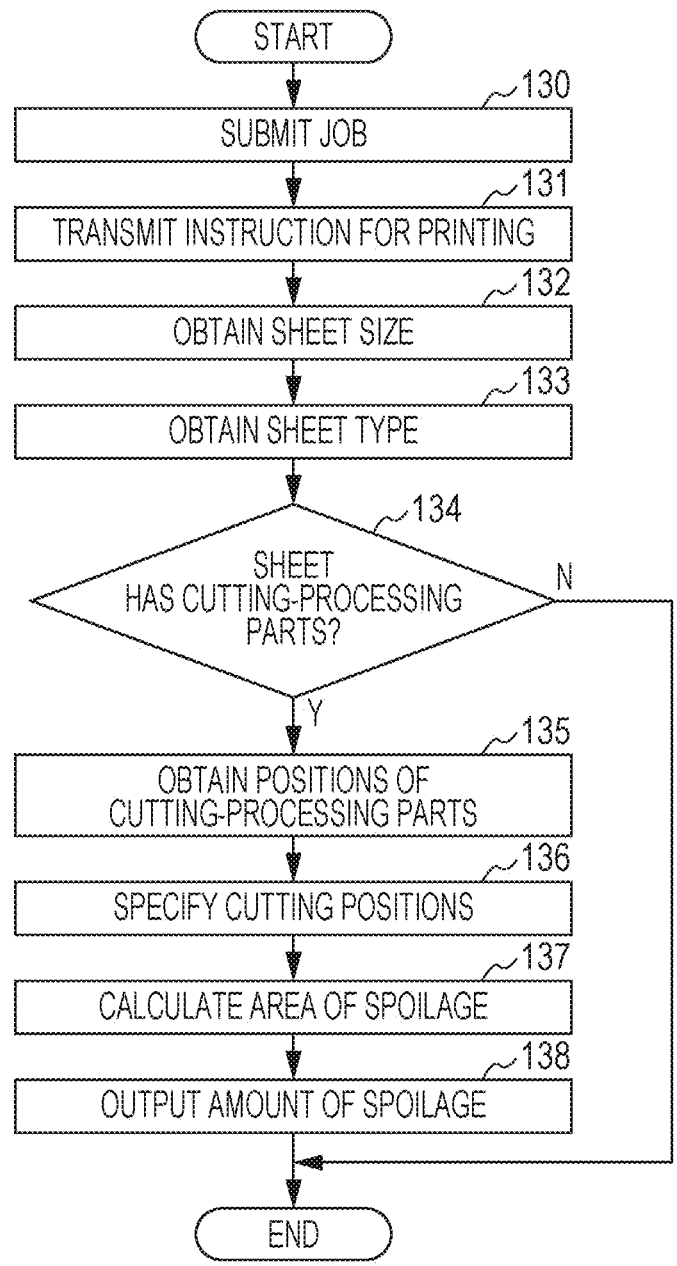
FIG. 11 is a flowchart of different exemplary processes performed by using a print management program according to the second exemplary embodiment.

Referring to FIG. 11, different operation of the print management apparatus 10 according to the second exemplary embodiment will be described.

FIG. 11 is a flowchart of different exemplary processes performed by using the print management program 15A according to the second exemplary embodiment.

In response to an instruction to output, as the amount of spoilage, the area of parts between pages defined by using cutting positions used in the post-processing, the print management apparatus 10 activates the print management program 15A, and performs the steps described below.

In step 130 in FIG. 11, the job submitting unit 11A submits a job to the job managing unit 11C.

In step 131, the job submitting unit 11A notifies the job managing unit 11C of an instruction to print the job submitted in step 130.

In step 132, the job managing unit 11C obtains the sheet size of the continuous sheet from the apparatus controller 11B.

In step 133, the job managing unit 11C obtains the sheet type of the continuous sheet from the apparatus controller 11B.

In step 134, the job managing unit 11C determines whether or not the continuous sheet has cutting-processing parts on the basis of the sheet type obtained in step 133. If it is determined that the continuous sheet has part processed for cutting (in the case of the positive determination result), the process proceeds to step 135. If it is determined that the continuous sheet has no part processed for cutting (in the case of the negative determination result), the series of processes performed by using the print management program 15A end.

In step 135, the job managing unit 11C obtains the positions of the part processed for cutting from the apparatus controller 11B.

In step 136, the job managing unit 11C specifies the cutting positions on the basis of the positions of the part processed for cutting obtained in step 135.

Figure 12:
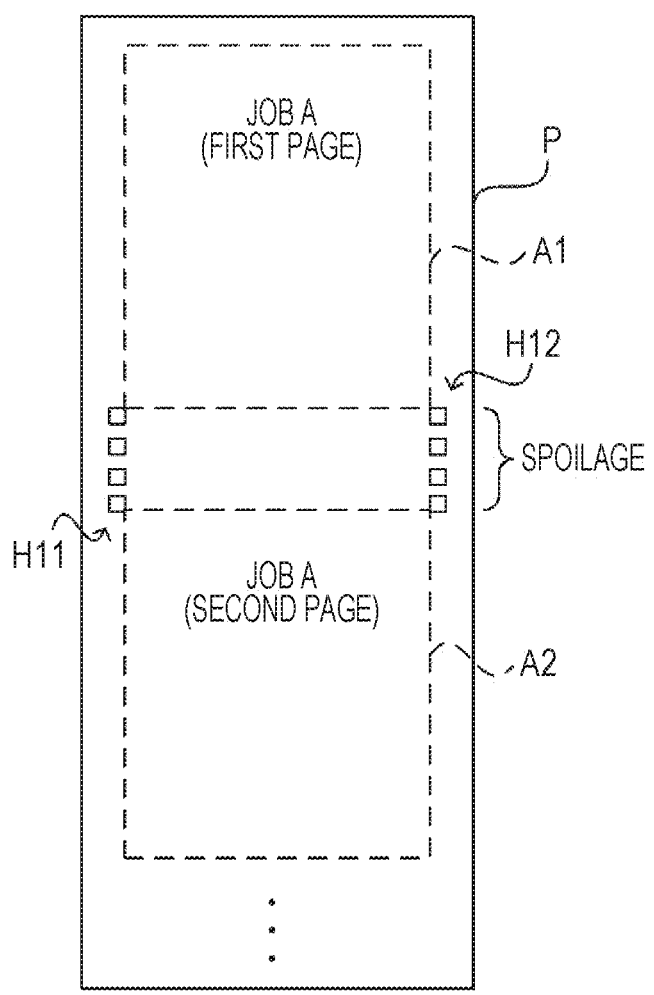
FIG. 12 is a diagram for describing another method of calculating the area of spoilage, according to the second exemplary embodiment.

In step 137, the job managing unit 11C calculates the area of spoilage on the basis of the sheet size obtained in step 132 and the cutting positions specified in step 136. Referring to FIG. 12, a method of calculating the area of spoilage in the case where parts between pages defined by using the positions of part processed for cutting are regarded as spoilage will be described specifically.

FIG. 12 is a diagram for describing another method of calculating the area of spoilage, according to the second exemplary embodiment.

In the example in FIG. 12, job A containing multiple pages is processed on a continuous sheet P. A product part A1 corresponding to the first page of job A and a product part A2 corresponding to the second page are cut in alignment with the positions of part processed for cutting H11 and H12 (in the example in FIG. 12, represented by multiple rectangular holes). The positional information of the part processed for cutting H11 and H12 is held by the print control apparatus 20. Thus, the cutting positions are specified from the positions of the part processed for cutting H11 and H12. In the example in FIG. 12, the part between the first page and the second page is regarded as spoilage. When the length of the part is L mm, the area of spoilage is calculated as W mm×L mm. The part processed for cutting H11 and H12 may be, for example, pin holes or perforations.

In step 138, the job managing unit 11C tabulates the area of spoilage, which is calculated in step 137, as the amount of spoilage for the corresponding one of jobs. The job managing unit 11C outputs the tabulation result, for example, to the display unit 16. Then, the series of processes performed by using the print management program 15A end.

When the post-processing apparatus 40 has cutting information, the job managing unit 11C according to the second exemplary embodiment may obtain the cutting information from the post-processing apparatus 40 directly or through the printer 30. The job managing unit 11C may specify cutting positions on the basis of the obtained cutting information.

Figure 13:
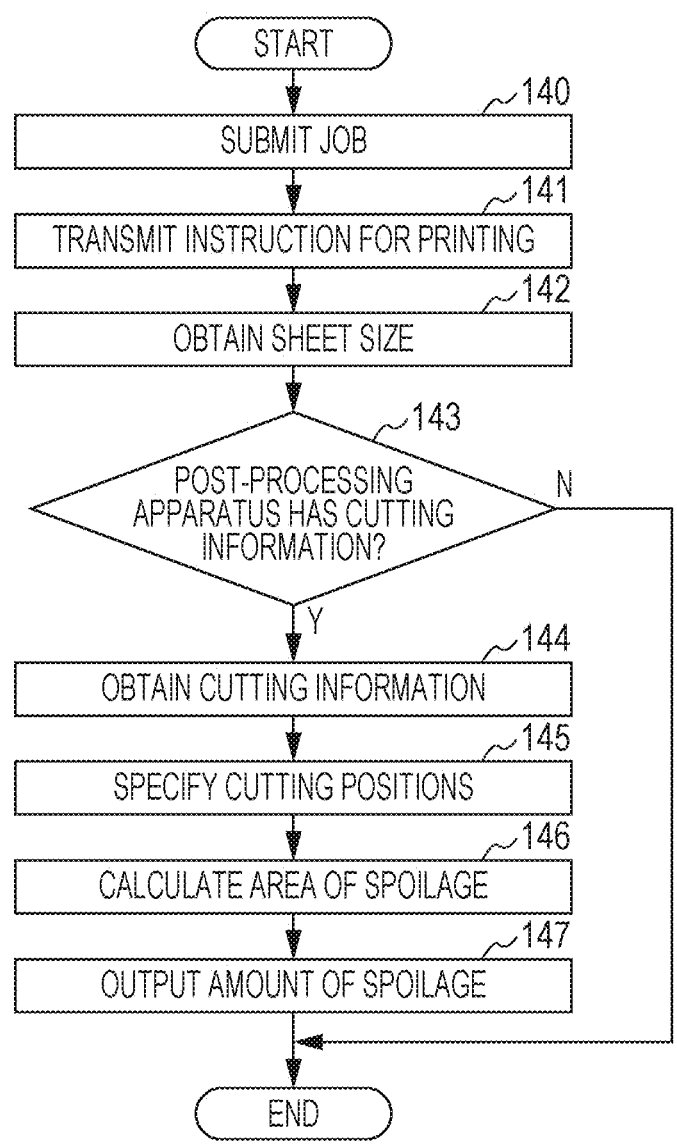
FIG. 13 is a flowchart of different exemplary processes performed by using a print management program according to the second exemplary embodiment.

Referring to FIG. 13, different operation of the print management apparatus 10 according to the second exemplary embodiment will be described.

FIG. 13 is a flowchart of different exemplary processes performed by using the print management program 15A according to the second exemplary embodiment.

In response to an instruction to output, as the amount of spoilage, the area of parts between pages defined by using cutting positions used in the post-processing, the print management apparatus 10 activates the print management program 15A, and performs the steps described below.

In step 140 in FIG. 13, the job submitting unit 11A submits a job to the job managing unit 11C.

In step 141, the job submitting unit 11A notifies the job managing unit 11C of an instruction to print the job submitted in step 140.

In step 142, the job managing unit 11C obtains the sheet size of the continuous sheet from the apparatus controller 11B.

In step 143, the job managing unit 11C determines whether or not the post-processing apparatus 40 has cutting information. If it is determined that the post-processing apparatus 40 has cutting information (in the case of the positive determination result), the process proceeds to step 144. If it is determined that the post-processing apparatus 40 has no cutting information (in the case of the negative determination result), the series of processes performed by using the print management program 15A end.

In step 144, the job managing unit 11C obtains the cutting information of the post-processing apparatus 40 from the apparatus controller 11B.

In step 145, the job managing unit 11C specifies the cutting positions on the basis of the cutting information obtained in step 144.

In step 146, the job managing unit 11C calculates the area of spoilage on the basis of the sheet size obtained in step 142 and the cutting positions determined in step 145.

In step 147, the job managing unit 11C tabulates the area of spoilage, which is calculated in step 146, as the amount of spoilage for the corresponding one of jobs. The job managing unit 11C outputs the tabulation result, for example, to the display unit 16. Then, the series of processes performed by using the print management program 15A end.

According to the second exemplary embodiment, parts between pages defined by using cutting positions used in the post-processing are specified as spoilage. Thus, the area of the parts between pages defined by using the cutting positions used in the post-processing is determined as spoilage.

By combining the first exemplary embodiment with the second exemplary embodiment, pages for control, not for a job, and parts between pages defined by using cutting positions used in the post-processing may be specified as spoilage.

Third Exemplary Embodiment

In a third exemplary embodiment, the case in which a part used in adjustment printing, which is different from normal printing, is specified as spoilage will be described.

The apparatus configuration of the print management apparatus 10, which is described in the first exemplary embodiment, is applied also to the third exemplary embodiment. The amount of spoilage according to the third exemplary embodiment is represented by the area of a part for an adjustment print job. The adjustment printing described herein means printing for adjusting the printer 30 or the print control apparatus 20 which controls the operations of the printer 30. In the adjustment printing, for example, a test pattern including the CMYK colors is printed.

Figure 14:
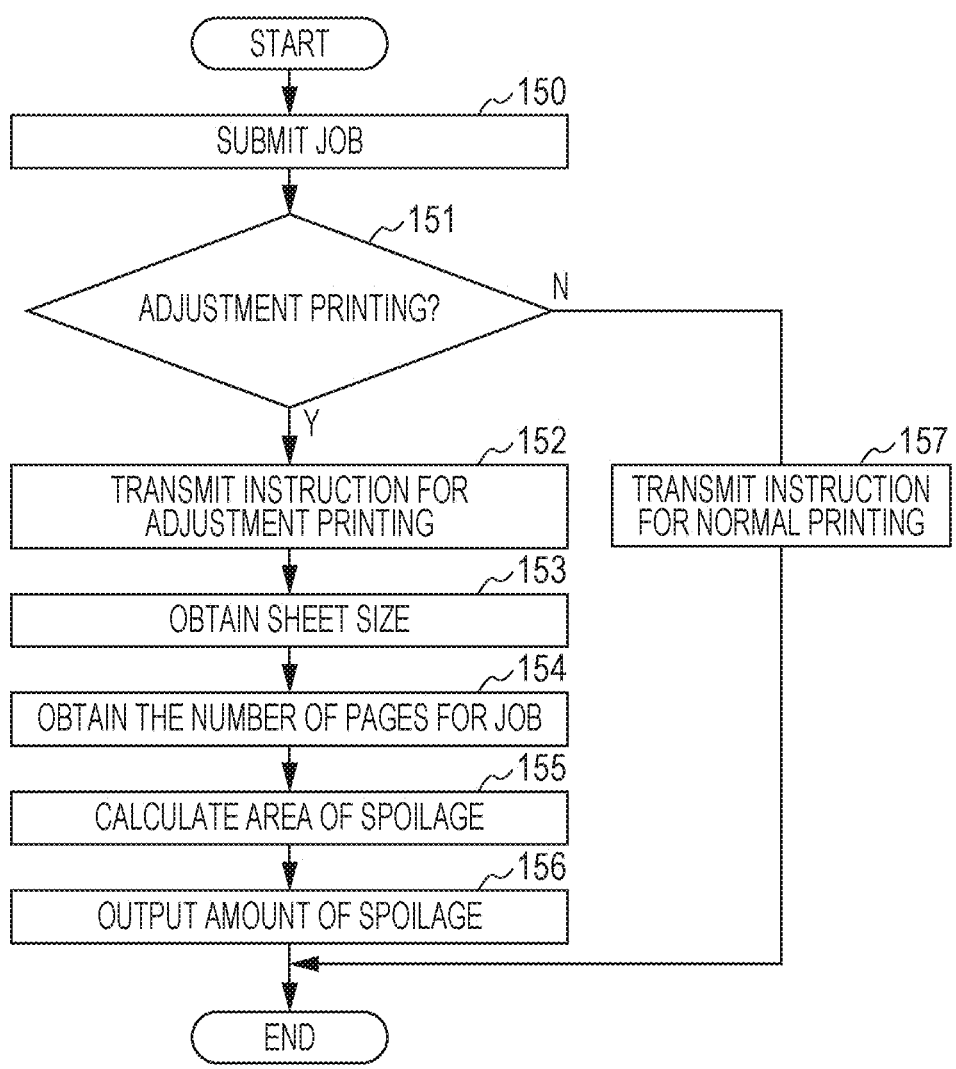
FIG. 14 is a flowchart of exemplary processes performed by a print management program according to a third exemplary embodiment.

Referring to FIG. 14, operation of the print management apparatus 10 according to the third exemplary embodiment will be described.

FIG. 14 is a flowchart of exemplary processes performed by using the print management program 15A according to the third exemplary embodiment.

In response to an instruction to output, as the amount of spoilage, the area of a part in which the adjustment printing is performed, the print management apparatus 10 activates the print management program 15A, and performs the steps described below.

In step 150 in FIG. 14, the job submitting unit 11A submits a job to the job managing unit 11C.

In step 151, the job submitting unit 11A (or the job managing unit 11C) determines whether or not the job submitted in step 150 is an adjustment print job. If it is determined that the job is an adjustment print job (in the case of the positive determination result), the process proceeds to step 152. If it is determined that the job is not an adjustment print job, that is, the job is a normal print job (in the case of the negative determination result), the process proceeds to step 157. The adjustment printing is activated, for example, on an adjustment-printing setting screen illustrated in FIG. 15.

Figure 15:
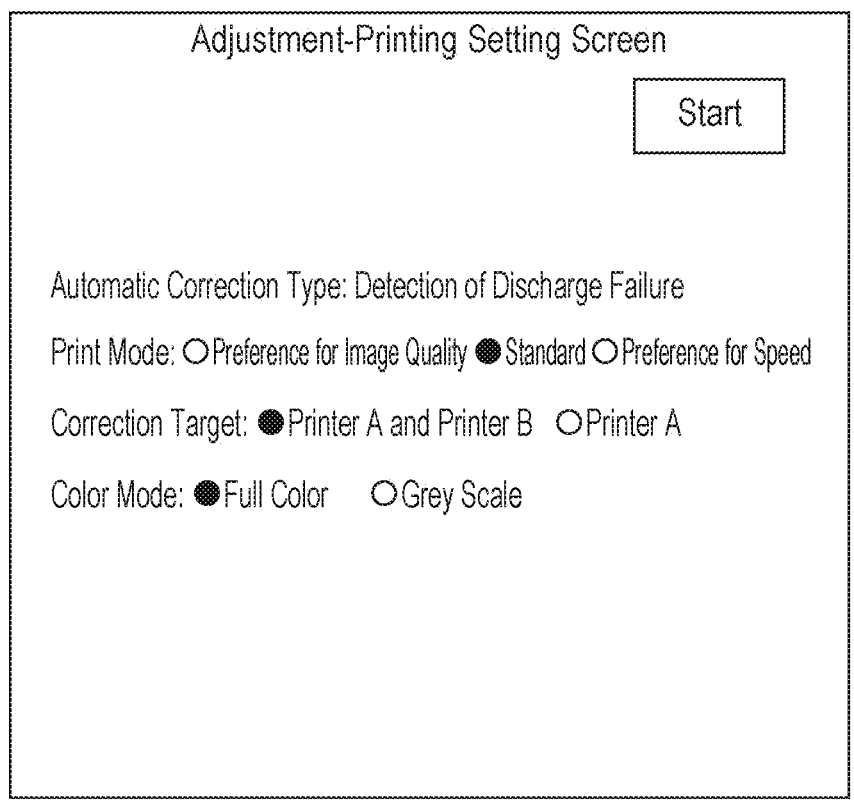
FIG. 15 is a diagram illustrating an exemplary adjustment-printing setting screen according to an exemplary embodiment.

FIG. 15 is a diagram illustrating an exemplary adjustment-printing setting screen according to the third exemplary embodiment.

The adjustment-printing setting screen illustrated in FIG. 15 is displayed in activation of the adjustment printing, and is different from a screen displayed in activation of normal printing. That is, the job submission sequence in the adjustment printing is different from that in the normal printing. Therefore, a job submitted from the adjustment-printing setting screen is determined as an adjustment print job. A job which is submitted not from the adjustment-printing setting screen is determined as a normal print job.

In step 152, the job submitting unit 11A notifies the job managing unit 11C of an instruction to print the adjustment print job submitted in step 150.

In step 153, the job managing unit 11C obtains the sheet size of the continuous sheet from the apparatus controller 11B.

In step 154, the job managing unit 11C obtains the number of pages for the adjustment print job from the apparatus controller 11B. A predetermined set value is used as the number of pages for an adjustment print job. The set value may be changed when appropriate by a person (operator) in charge of operation or the like.

In step 155, the job managing unit 11C calculates the area of spoilage on the basis of the sheet size obtained in step 153 and the number of pages for the adjustment print job which is obtained in step 154.

In step 156, the job managing unit 11C tabulates the area of spoilage, which is calculated in step 155, as the amount of spoilage for the next job of the adjustment print job. The job managing unit 11C outputs the tabulation result, for example, to the display unit 16. Then, the series of processes performed by using the print management program 15A end.

In contrast, in step 157, the job submitting unit 11A notifies the job managing unit 11C of an instruction to print the normal print job submitted in step 150. Then, the series of processes performed by using the print management program 15A end.

Figure 16:
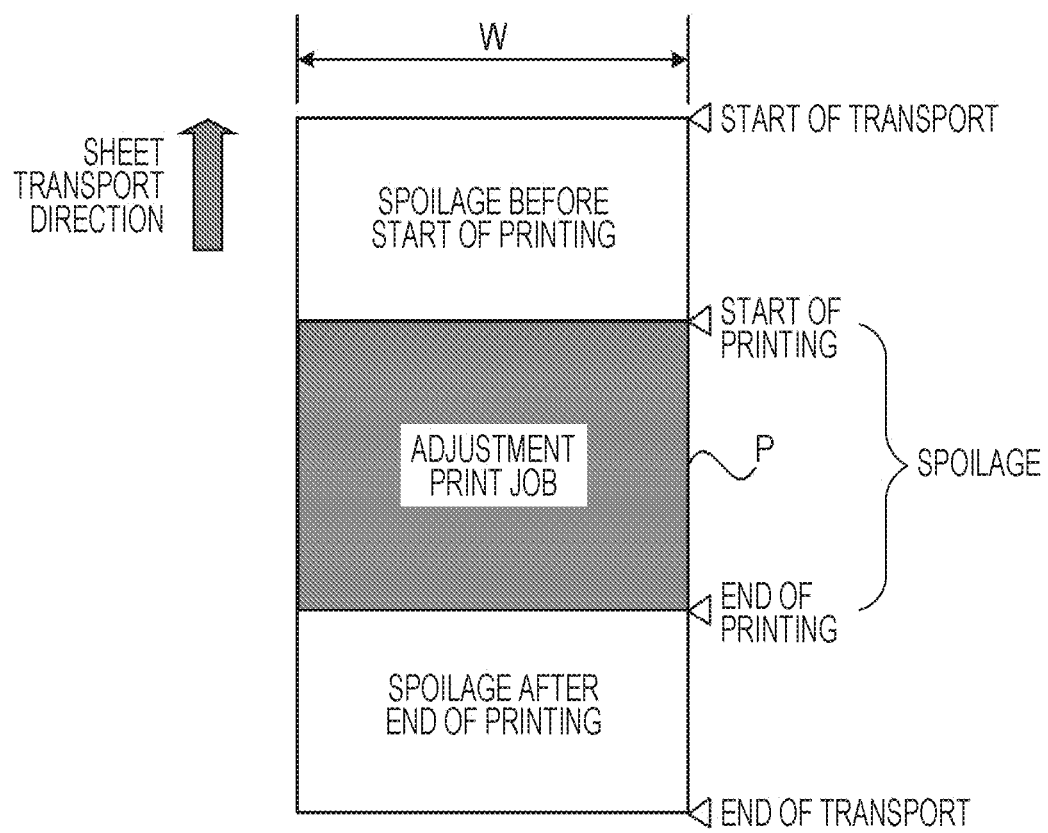
FIG. 16 is a diagram for describing a method of calculating the area of spoilage, according to the third exemplary embodiment.

Referring to FIG. 16, a method of calculating the area of spoilage in the case where a part used in adjustment printing is regarded as spoilage will be described specifically.

FIG. 16 is a diagram for describing the method of calculating the area of spoilage, according to the third exemplary embodiment.

In the example in FIG. 16, as described above, an adjustment print job for adjusting the printer 30 or the print control apparatus 20 is processed by using a continuous sheet P.

The position at which transport of the continuous sheet P starts is set to the position at which the count value of the sheet counter 31 of the printer 30 is set to zero. A part from the transport start position of the continuous sheet P to the print start position of the adjustment print job is regarded as spoilage before start of printing. The amount of spoilage before start of printing is calculated on the basis of the measurement result from the sheet counter 31. The amount of spoilage produced in an adjustment print job is calculated from the sheet size and the number of pages for the adjustment print job. A part from the print end position of the adjustment print job to the transport end position of the continuous sheet P is regarded as spoilage after end of printing. The amount of spoilage after end of printing is calculated on the basis of the measurement result from the sheet counter 31.

The total of the amount of spoilage before start of printing, the amount of spoilage produced by an adjustment print job, and the amount of spoilage after end of printing are calculated. The total amount of spoilage is thus calculated. In this case, for example, the total amount of spoilage is desirably associated with the next job of the adjustment print job. When the next job is performed subsequently to the adjustment print job, a part for the next job is inserted between the part for the adjustment print job and the spoilage after end of printing.

According to the third exemplary embodiment, a part used in the adjustment printing is specified as a part which is not used for a product. Thus, the area of a part used in the adjustment printing is determined as the amount of spoilage.

By combining the first exemplary embodiment, the second exemplary embodiment, and the third exemplary embodiment together, pages for control, not for a job, parts between pages defined by using cutting positions used in the post-processing, and a part used in the adjustment printing may be specified as spoilage.

Fourth Exemplary Embodiment

In a fourth exemplary embodiment, the case in which a part transported while the power supply of the print control apparatus is switched off is specified as spoilage will be described.

The apparatus configuration of the print management apparatus 10, which is described in the first exemplary embodiment, is applied also to the fourth exemplary embodiment. The amount of spoilage according to the fourth exemplary embodiment is represented as the area of a part defined by using the position of the continuous sheet at which the power supply of the print control apparatus 20, which controls the operations of the printer 30, is switched off and the position of the continuous sheet at which the power supply of the print control apparatus 20 is switched on.

Figure 17:
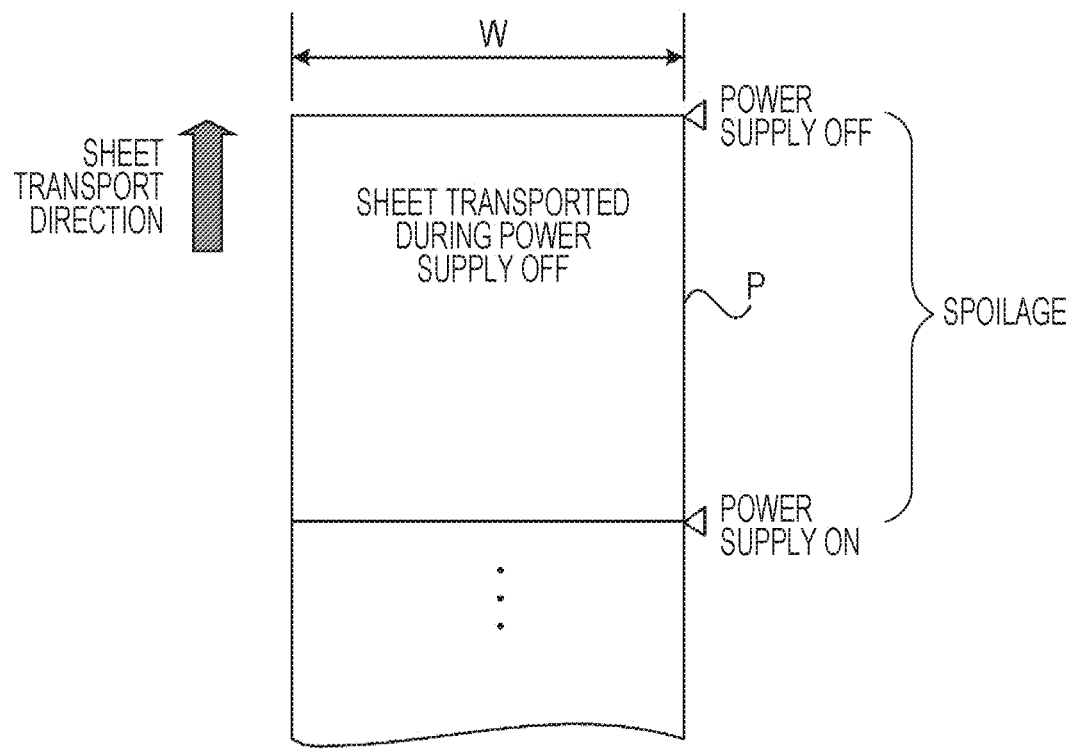
FIG. 17 is a diagram for describing a method of calculating the area of spoilage, according to a fourth exemplary embodiment.

FIG. 17 is a diagram for describing a method of calculating the area of spoilage, according to the fourth exemplary embodiment.

The example in FIG. 17 assumes the case in which a continuous sheet P of the printer 30 is transported in the state in which the power supply of the print control apparatus 20 is switched off. The power supply of the printer 30 is always switched on, and the continuous sheet P may be transported. At that time, the sheet counter 31 is used to count the position of the continuous sheet P at which the power supply of the print control apparatus 20 is switched off, and the count value at that time is stored. After that, the sheet counter 31 is used to count the position of the continuous sheet P at which the power supply of the print control apparatus 20 is switched on, and the count value at that time is stored. When these two count values are different from each other, the continuous sheet P has been transported in the switch-off state of the power supply of the print control apparatus 20. A part corresponding to the difference is regarded as spoilage. When the length of the part is L mm, the area of the spoilage is calculated as W mm×L mm. If there is no difference between these two count values, the continuous sheet P has not been transported in the switch-off state of the power supply of the print control apparatus 20, resulting in no spoilage.

Fifth Exemplary Embodiment

In a fifth exemplary embodiment, the case in which a part transported in an operation other than a printing operation is specified as spoilage will be described.

The apparatus configuration of the print management apparatus 10, which is described in the first exemplary embodiment, is applied also to the fifth exemplary embodiment. The amount of spoilage according to the fifth exemplary embodiment is represented as the area of a part transported in an operation other than a printing operation of the printer 30. Specifically, when the operation other than a printing operation is an operation of transporting a continuous sheet, the area of a transported part is the area of a part defined by using the position at which transport of the continuous sheet starts and the position at which transport of the continuous sheet ends. The power supply of the print control apparatus 20 is in the switch-on state.

Figure 18:
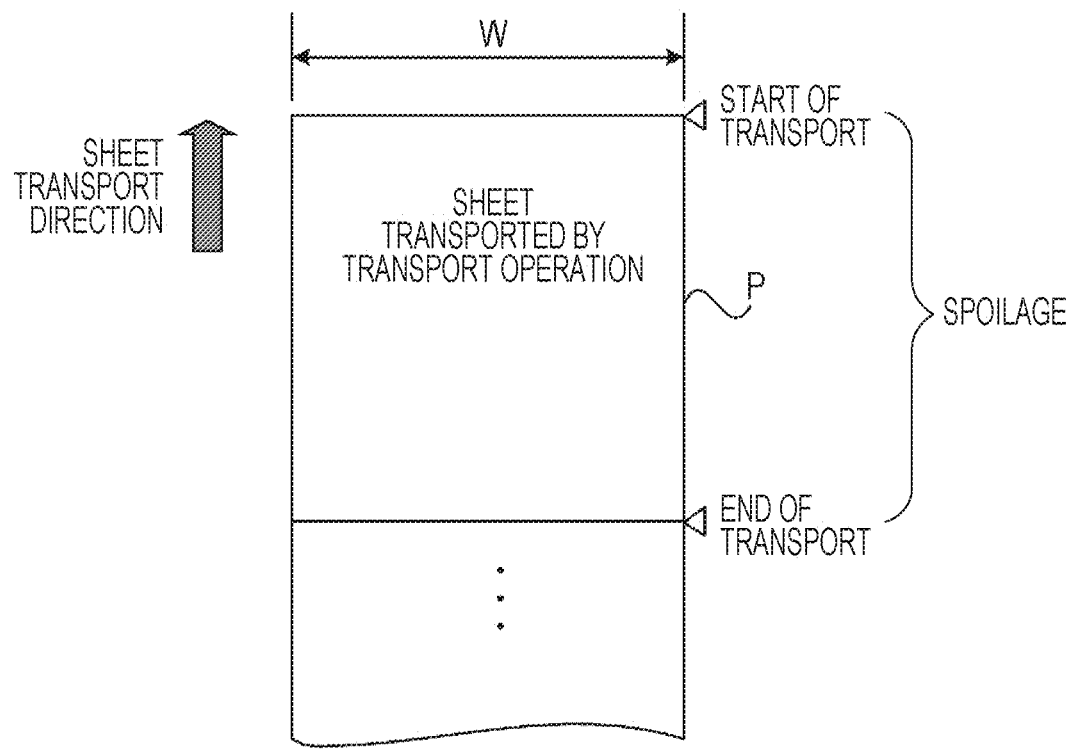
FIG. 18 is a diagram for describing a method of calculating the area of spoilage, according to a fifth exemplary embodiment.

FIG. 18 is a diagram for describing a method of calculating the area of spoilage, according to the fifth exemplary embodiment.

The example in FIG. 18 assumes the case in which a continuous sheet P of the printer 30 is transported without printing. At that time, the sheet counter 31 is used to count the position at which transport of the continuous sheet P starts, and the count value is stored. Similarly, the sheet counter 31 is used to count the position at which transport of the continuous sheet P ends, and the count value is stored. A part corresponding to the difference between these two count values is regarded as spoilage. When the length of the part is L mm, the area of spoilage is calculated as W mm×L mm.

When the operation other than a printing operation is an operation of replacing the continuous sheet, the area of the transported part is represented as the area of a part determined by a move of a seam, which connects the printed continuous sheet with a next continuous sheet with which the printed continuous sheet is replaced, from one end to the other end in the transport direction of the printer 30.

Figure 19:
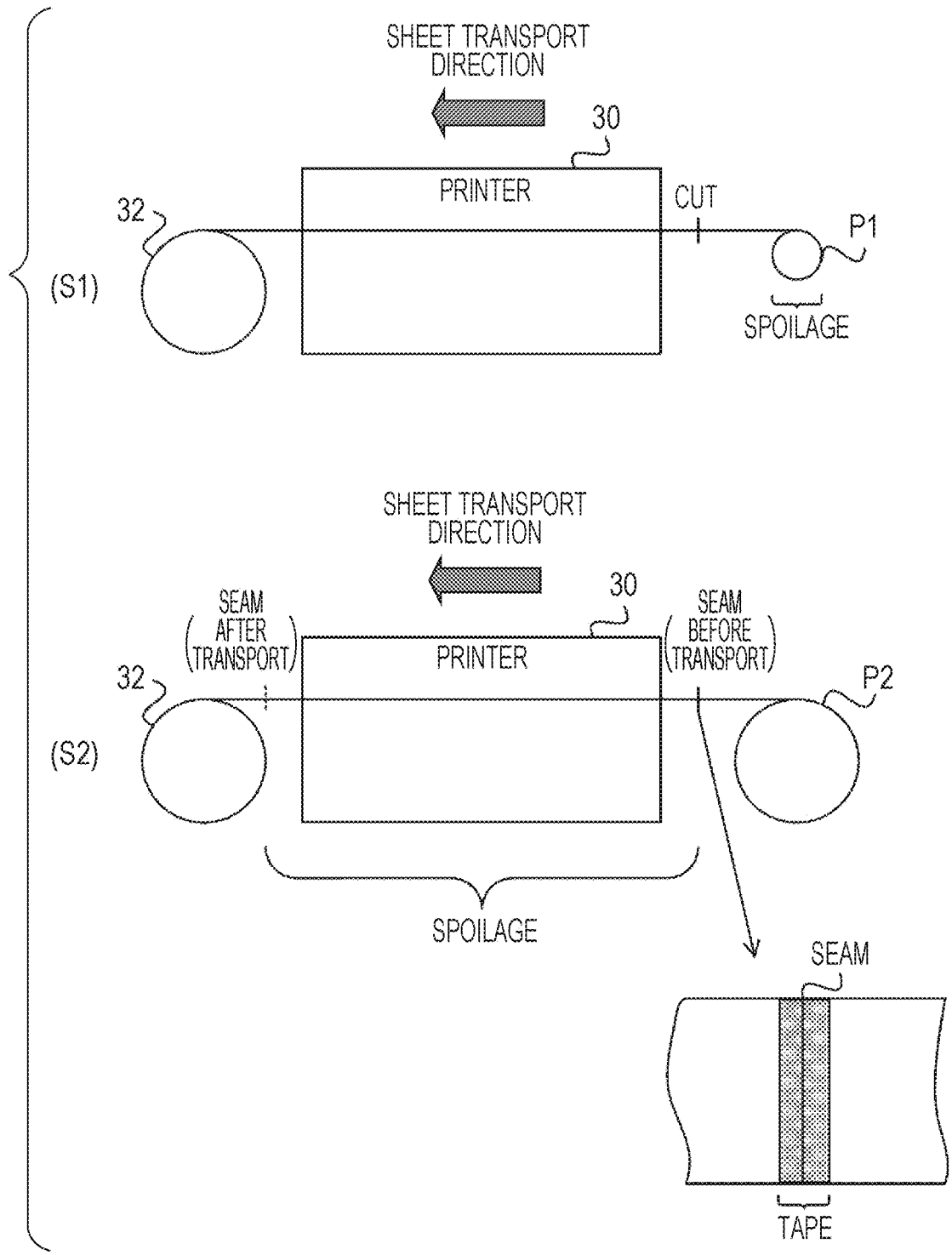
FIG. 19 is a diagram for describing another method of calculating the area of spoilage, according to the fifth exemplary embodiment.

FIG. 19 is a diagram for describing another method of calculating the area of spoilage, according to the fifth exemplary embodiment.

In (S1), the case in which a continuous sheet P1 is a roll sheet is assumed. The continuous sheet P1 is transported from one end to the other end of the printer 30, and is subjected to printing. The printed continuous sheet P1 is wound up by using a take-up roller 32. The remaining continuous sheet P1, which has not been subjected to printing, is cut when the remaining amount reaches a given value, and is replaced with a next continuous sheet. The remaining amount of the continuous sheet P1 having been replaced through the replacement operation is regarded as spoilage. The amount of spoilage at that time is calculated, for example, by using the diameter of the roll of the continuous sheet P1 which has not been subjected to printing.

In (S2), the remaining continuous sheet P1 is replaced with a next continuous sheet P2 which is the replacement target. At that time, the printed continuous sheet P1 which has been wound up by using the take-up roller 32 is connected to the next continuous sheet P2 by using a tape. The seam between the continuous sheet P1 and the continuous sheet P2 is desirably not used in printing in terms of quality. The seam is transported from one end to the other end in the transport direction of the printer 30, and is transported to the outside of the printer 30. The part transported due to transport of the seam is regarded as spoilage. When the length of the part is L mm, the area of spoilage is calculated as W mm×L mm.

Sixth Exemplary Embodiment

In a sixth exemplary embodiment, the case in which the amounts of spoilage are displayed on a user interface (UI) will be described.

The apparatus configuration of the print management apparatus 10, which is described in the first exemplary embodiment, is applied also to the sixth exemplary embodiment.

Figure 20:
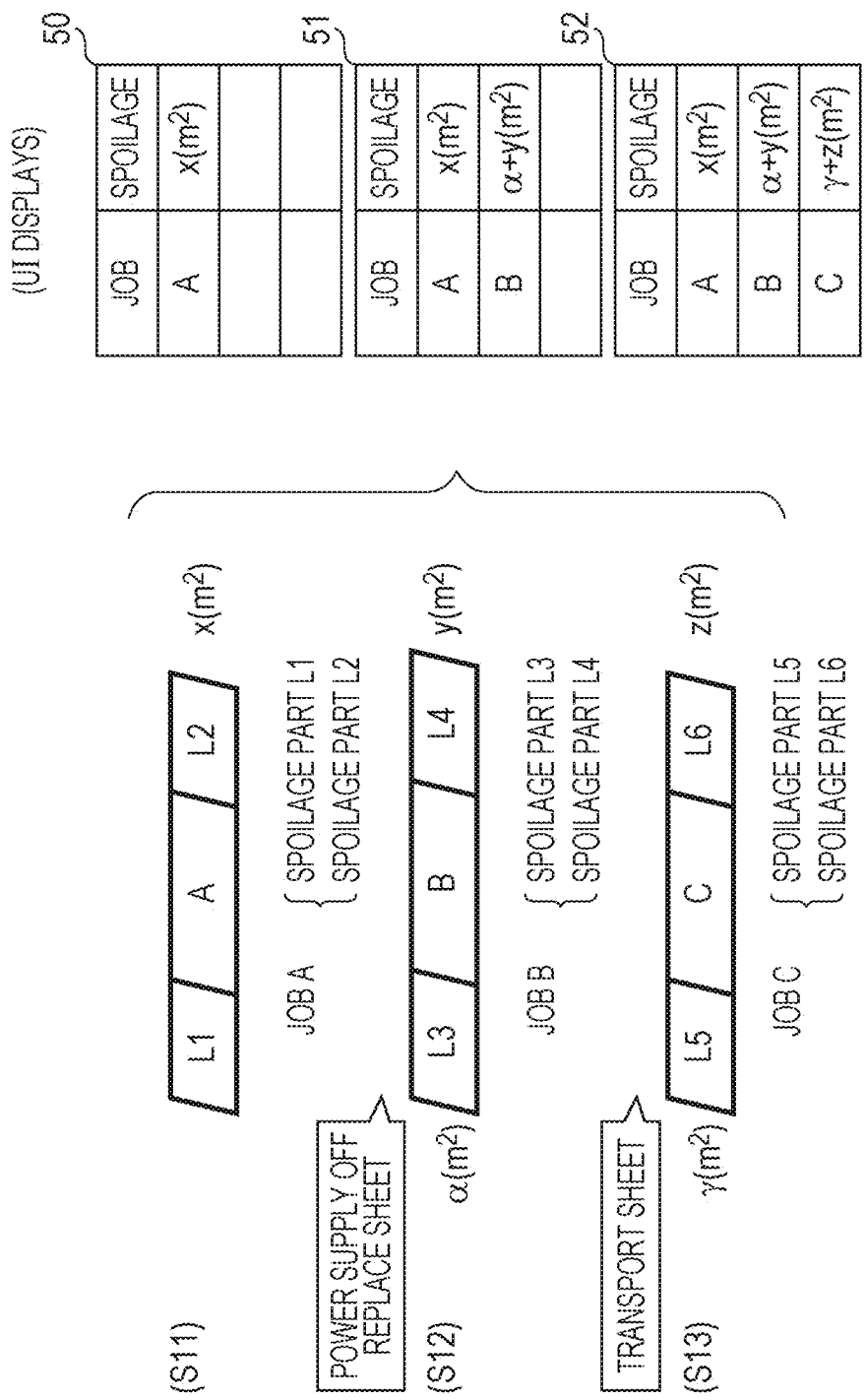
FIG. 20 is a diagram illustrating exemplary UI displays according to a sixth exemplary embodiment.

FIG. 20 is a diagram illustrating exemplary UI displays according to the sixth exemplary embodiment.

In (S11), in printing of job A, a spoilage part L1 and a spoilage part L2 are produced before and after printing of job A. Assume that the total of the spoilage part L1 and the spoilage part L2 is x ($m^2$). A UI display 50 displays the amount of spoilage for job A.

In (S12), the continuous sheet is replaced while the power supply of the print control apparatus 20 is switched off, and job B is then printed. In this case, a spoilage part L3 and a spoilage part L4 are produced before and after printing of job B. The spoilage part L3 is $\alpha$ ($m^2$) and the spoilage part L4 is y ($m^2$). The total of the spoilage part L3 and the spoilage part L4 is $\alpha$+y ($m^2$). A UI display 51 displays the amount of spoilage for job A and that for job B.

In (S13), the continuous sheet is transported, and job C is then printed. In this case, a spoilage part L5 and a spoilage part L6 are produced before and after printing of job C. The spoilage part L5 is $\gamma$ ($m^2$), and the spoilage part L6 is z ($m^2$). The total of the spoilage part L5 and the spoilage part L6 is $\gamma$+z ($m^2$). A UI display 52 displays the amount of spoilage for job A, that for job B, and that for job C.

According to the sixth exemplary embodiment, parts, which are not used for products, of a continuous sheet are determined as the amounts of spoilage. That is, the amounts of spoilage parts other than products are made visible, achieving appropriate cost management of a printing company or the like.

In the embodiments above, the term "processor" refers to hardware in a broad sense. Examples of the processor include general processors (e.g., CPU: Central Processing Unit), and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

A print management apparatus according to the exemplary embodiments is described by way of example. The exemplary embodiments may be provided in the form of a program for causing a computer to perform the functions of the units of the print management apparatus. The exemplary embodiments may be provided in the form of a computer-readable storage medium in which the program is stored.

In addition, the configuration of the print management apparatus described in the exemplary embodiments is exemplary, and may be changed as appropriate without departing from the gist of the present disclosure.

The process flow of the program described in the exemplary embodiments is also exemplary. Unnecessary steps may be deleted, new steps may be added, or the process order may be changed without departing from the gist of the present disclosure.

In the exemplary embodiments, the case in which execution of a program causes the processes according to the exemplary embodiments to be implemented through a software configuration by using a computer is described. However, this is not limiting. The exemplary embodiments may be implemented, for example, through a hardware configuration or through a combination of a hardware configuration with a software configuration.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A print management apparatus comprising:
a processor configured to,
when a printer configured to perform printing on a continuous sheet prints a job on the continuous sheet, the job containing a plurality of pages, output an area of a part of the continuous sheet as an amount of spoilage, the part being not used for a product manufactured by using printed material corresponding to the job,
wherein a total amount of spoilage is calculated based on the amount of spoilage before start of printing and the amount of spoilage after start of printing.

2. The print management apparatus according to claim 1, wherein the amount of spoilage includes an area of a part corresponding to a page for control, not for the job.

3. The print management apparatus according to claim 1, wherein the amount of spoilage further includes an area of a part between pages, the part between pages being defined by using cutting positions at which cutting is performed in accordance with the plurality of pages by using a post-processing apparatus connected to the printer.

4. The print management apparatus according to claim 2, wherein the amount of spoilage further includes an area of a part between pages, the part between pages being defined by using cutting positions at which cutting is performed in accordance with the plurality of pages by using a post-processing apparatus connected to the printer.

5. The print management apparatus according to claim 3, wherein the processor is configured to,
when a print control apparatus controls printing of cutting marks on the continuous sheet, the print control apparatus controlling an operation of the printer, obtain print information including the cutting marks from the print control apparatus, and specify the cutting positions on a basis of the obtained print information.

6. The print management apparatus according to claim 3, wherein the processor is configured to,
when the job includes cutting marks, obtain positions of the cutting marks from a print control apparatus controlling an operation of the printer, the cutting marks being included in the job, and specify the cutting positions on a basis of the obtained positions of the cutting marks.

7. The print management apparatus according to claim 3, wherein the processor is configured to,
when the continuous sheet has parts processed for cutting, obtain positions of the parts processed for cutting in the continuous sheet from a print control apparatus controlling an operation of the printer, and specify the cutting positions on a basis of the obtained positions of the parts processed for cutting.

8. The print management apparatus according to claim 3, wherein the processor is configured to,
when the post-processing apparatus has cutting information, obtain the cutting information from the post-processing apparatus directly or through the printer, and specify the cutting positions on a basis of the obtained cutting information.

9. The print management apparatus according to claim 2, wherein the processor is configured to
tabulate the amount of spoilage for a corresponding one of jobs.

10. The print management apparatus according to claim 1, wherein the amount of spoilage further includes an area of a part corresponding to an adjustment print job of performing printing for adjustment of the printer or adjustment of a print control apparatus controlling an operation of the printer.

11. The print management apparatus according to claim 2, wherein the amount of spoilage further includes an area of a part corresponding to an adjustment print job of performing printing for adjustment of the printer or adjustment of a print control apparatus controlling an operation of the printer.

12. The print management apparatus according to claim 3, wherein the amount of spoilage further includes an area of a part corresponding to an adjustment print job of performing printing for adjustment of the printer or adjustment of a print control apparatus controlling an operation of the printer.

13. The print management apparatus according to claim 10, wherein the processor is configured to
calculate a total amount of spoilage in association with a next job of the adjustment print job.

14. The print management apparatus according to claim 1, wherein the amount of spoilage includes an area of a part defined by using a first position of the continuous sheet and a second position of the continuous sheet, the first position being a position at which power supply of a print control apparatus is switched off, the print control apparatus controlling an operation of the printer, the second position being a position at which the power supply of the print control apparatus is switched on.

15. The print management apparatus according to claim 1, wherein the amount of spoilage includes an area of a part transported in an operation other than a printing operation of the printer.

16. The print management apparatus according to claim 15, wherein, when the operation other than a printing operation is an operation of transporting the continuous sheet, the area of the part is an area of a part defined by using a start position and an end position, the start position being a position at which transport of the continuous sheet starts, the end position being a position at which transport of the continuous sheet ends.

17. The print management apparatus according to claim 15,
wherein, when the operation other than a printing operation is a replacement operation of replacing the continuous sheet, the area of the part is an area of a part determined by a move of a seam, the seam connecting the continuous sheet to a next continuous sheet which is a replacement target, the move of the seam being made when the seam is transported from a first end to a second end of the printer in a transport direction.

18. The print management apparatus according to claim 16,
wherein, when the operation other than a printing operation is a replacement operation of replacing the continuous sheet, the area of the part is an area of a part determined by a move of a seam, the seam connecting the continuous sheet to a next continuous sheet which is a replacement target, the move of the seam being made when the seam is transported from a first end to a second end of the printer in a transport direction.

19. The print management apparatus according to claim 17,
wherein, when the continuous sheet is a roll sheet, the amount of spoilage further includes a remaining amount of the continuous sheet having been replaced through the replacement operation.

20. A non-transitory computer readable medium storing a program causing a computer to execute a process for print management, the process comprising:
when a printer configured to perform printing on a continuous sheet prints a job on the continuous sheet, the job containing a plurality of pages, outputting an area of a part of the continuous sheet as an amount of spoilage, the part being not used for a product manufactured by using printed material corresponding to the job,
wherein a total amount of spoilage is calculated based on the amount of spoilage before start of printing and the amount of spoilage after start of printing.

* * * * *